United States Patent [19]
Kuo

[11] Patent Number: 6,022,228
[45] Date of Patent: Feb. 8, 2000

[54] ELECTRONIC CARD CONNECTOR WITH DETACHABLE CARD RELEASE BAR

[75] Inventor: Ming-Lun Kuo, Taipei, Taiwan

[73] Assignee: Hon Hai Precision Ind. Co., Ltd., Taipei Hsien, Taiwan

[21] Appl. No.: 09/347,367

[22] Filed: Jul. 6, 1999

[30] Foreign Application Priority Data

Dec. 22, 1998 [TW] Taiwan .................................. 87221332

[51] Int. Cl.[7] .................................................. H01R 13/62
[52] U.S. Cl. .................................................................. 439/159
[58] Field of Search .................................... 439/159, 160, 439/64, 152–157

[56] References Cited

U.S. PATENT DOCUMENTS

| | | | |
|---|---|---|---|
| 5,492,481 | 2/1996 | Lewis | 439/159 |
| 5,507,658 | 4/1996 | Ho | 439/159 |
| 5,653,603 | 8/1997 | Sasao et al. | 439/159 |
| 5,655,918 | 8/1997 | Soh | 439/159 |
| 5,829,996 | 11/1998 | Yamane et al. | 439/159 |

*Primary Examiner*—Gary F. Paumen
*Attorney, Agent, or Firm*—Wei Te Chung

[57] ABSTRACT

An electronic card connector includes a header having two opposite guide arms for receiving an electronic card therein. Contact elements are retained in the header and are electrically engageable with the electronic card. The header forms two pivot pins. A rocking member defines two holes alternately receiving the pivot pins therein for selectively forming a pivotal joint between either one of the pivot pins and the corresponding hole. Each guide arm defines a slide channel formed by two inwardly extending flanges. An elongate slot is defined in the slide channel. A card release bar has at least a projection forming two outwardly extending flanges selectively received in the slide channel of either one of the guide arms and guidingly engaged with the inwardly extending flanges thereof. The projection of the card release bar has a resilient extension forming a barb thereon. The barb engages with the elongate slot for guiding the card release bar to move along the slide channel thereby bringing an inner end of the bar to drive the rocking member which in turn engages with and releases the electronic card from the connector. The resilient extension allows the barb to disengage from the slot for detaching the card release bar from the guide arm whereby the card release bar is selectively mounted to either one of the guide arms. Thus, the connector may be operated from either side.

9 Claims, 5 Drawing Sheets

6,022,228

ELECTRONIC CARD CONNECTOR WITH DETACHABLE CARD RELEASE BAR

BACKGROUND OF THE INVENTION

1. Field of the Invention

The present invention generally relates to an electronic card connector, and in particular to an electronic card connector having a detachable card release bar which may be selectively mounted to either side of the connector.

2. The Prior Art

An electronic card connector releasably connects an electronic card, such as a memory card, to a main board of a host machine for expansion of resources thereof. Examples of the electronic card connector are disclosed in Taiwan Patent Application Nos. 84210015, 84217977 and 86204066.

FIG. 5 of the attached drawings shows a conventional electronic card connector. The electronic card connector, designated by reference numeral 5, comprises an insulative header 51 having a pair of parallel extensions 511 formed on opposite ends thereof. Each extension 511 defines a guide channel 512 in an inside face thereof. A guide arm 52 is attached to each extension 511 and defines a guide slot 521 corresponding to the guide channel 512 of the extension 511 for guiding an electronic card to engage with the header 51. A pair of projections 522 is formed on an outside face of one of the guide arms 52 and each defines an aligned bore 523 for axially and movably receiving a card release bar 54 therein.

A shielding member 53 is attached to the header 51 and engages with the guide arms 52 thereby securing the guide arms 52 to the header 51. The shielding member 53 protects the connector 5 from external electromagnetic interference. A rocking member 55 is pivotally supported on the shielding member 53 and is coupled with the card release bar 54 whereby axial movement of the card release bar 54 within the bores 523 of the guide arm 52 causes the rocking member 55 to rotate and thus drive the electronic card out of the connector 5.

The projections 522 that retain the card release bar 54 on the guide arm 52 are located outside the guide arm 52 thereby occupying additional space. The space is therefore wasted when the connector 5 does not require a card release mechanism. Furthermore, the conventional electronic card connector does not allow the card release bar to be selectively mounted on either one of the two guide arms.

It is thus desirable to have an electronic card connector that eliminates the problems mentioned above.

SUMMARY OF THE INVENTION

Accordingly, an object of the present invention is to provide an electronic card connector occupying a small space.

Another object of the present invention is to provide an electronic card connector comprising a card release bar selectively mounted to either side of the connector.

To achieve the above objects, an electronic card connector in accordance with the present invention comprises a header having two opposite guide arms for receiving an electronic card therein. Contact elements are retained in the header and are electrically engageable with the electronic card. The header forms two pivot pins. A rocking member defines two holes alternately receiving the pivot pins therein for selectively forming a pivotal joint between either one of the pivot pins and the corresponding hole. Each guide arm defines a slide channel formed by two inwardly extending flanges. An elongate slot is defined in the slide channel. A card release bar has at least a projection forming two outwardly extending flanges selectively received in the slide channel of either one of the guide arms and guidingly engaged with the inwardly extending flanges thereof. The projection of the card release bar has a resilient extension forming a barb thereon. The barb engages with the elongate slot for guiding the card release bar to move along the slide channel thereby bringing an inner end of the bar to drive the rocking member which in turn engages with and releases the electronic card from the connector. The resilient extension allows the barb to disengage from the slot for detaching the card release bar from the guide arm whereby the card release bar is selectively mounted to either one of the guide arms. Thus, the connector may be operated from either side.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
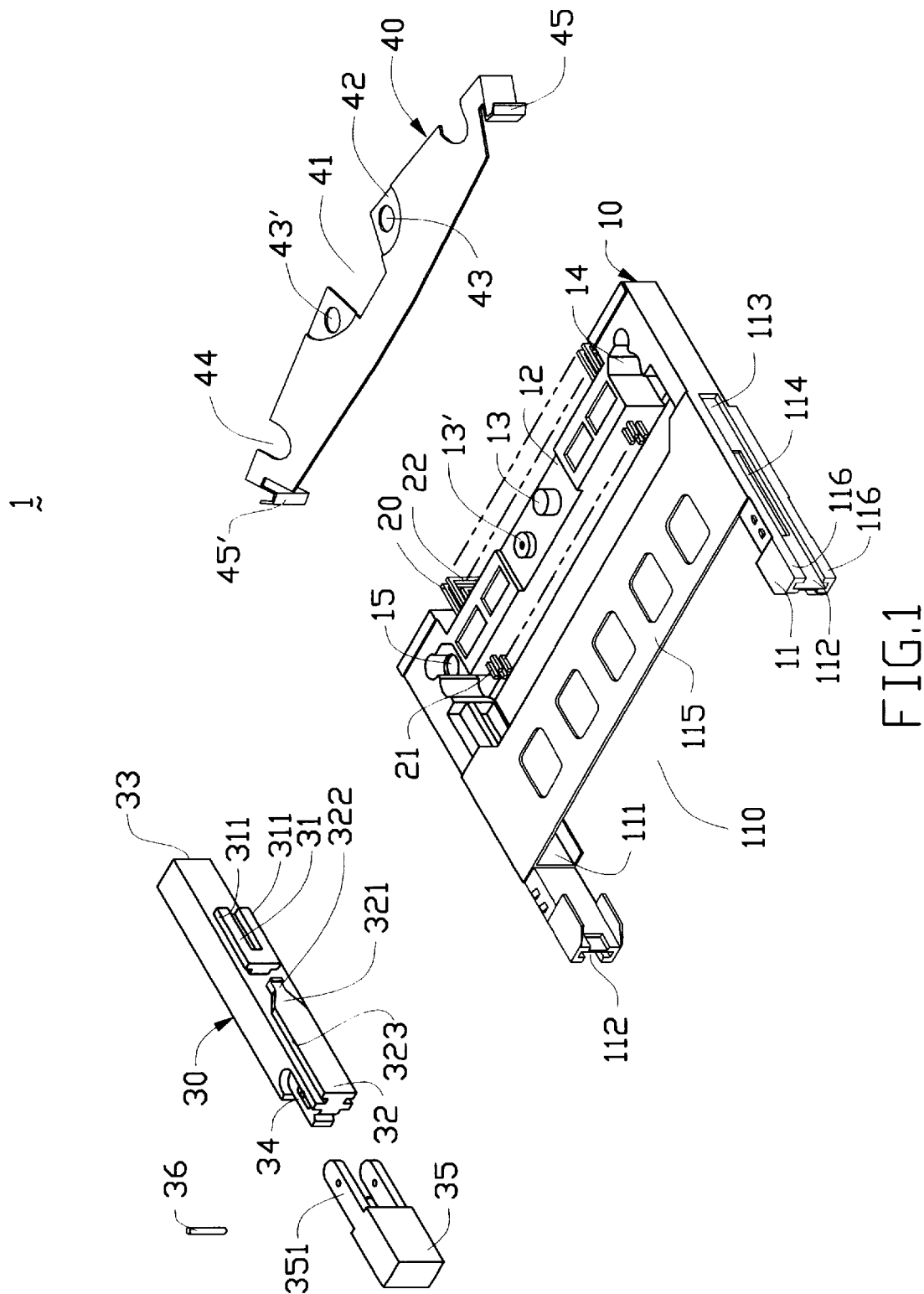
FIG. 1 in exploded view of an electronic card connector constructed in accordance with the present invention.
Figure 2:
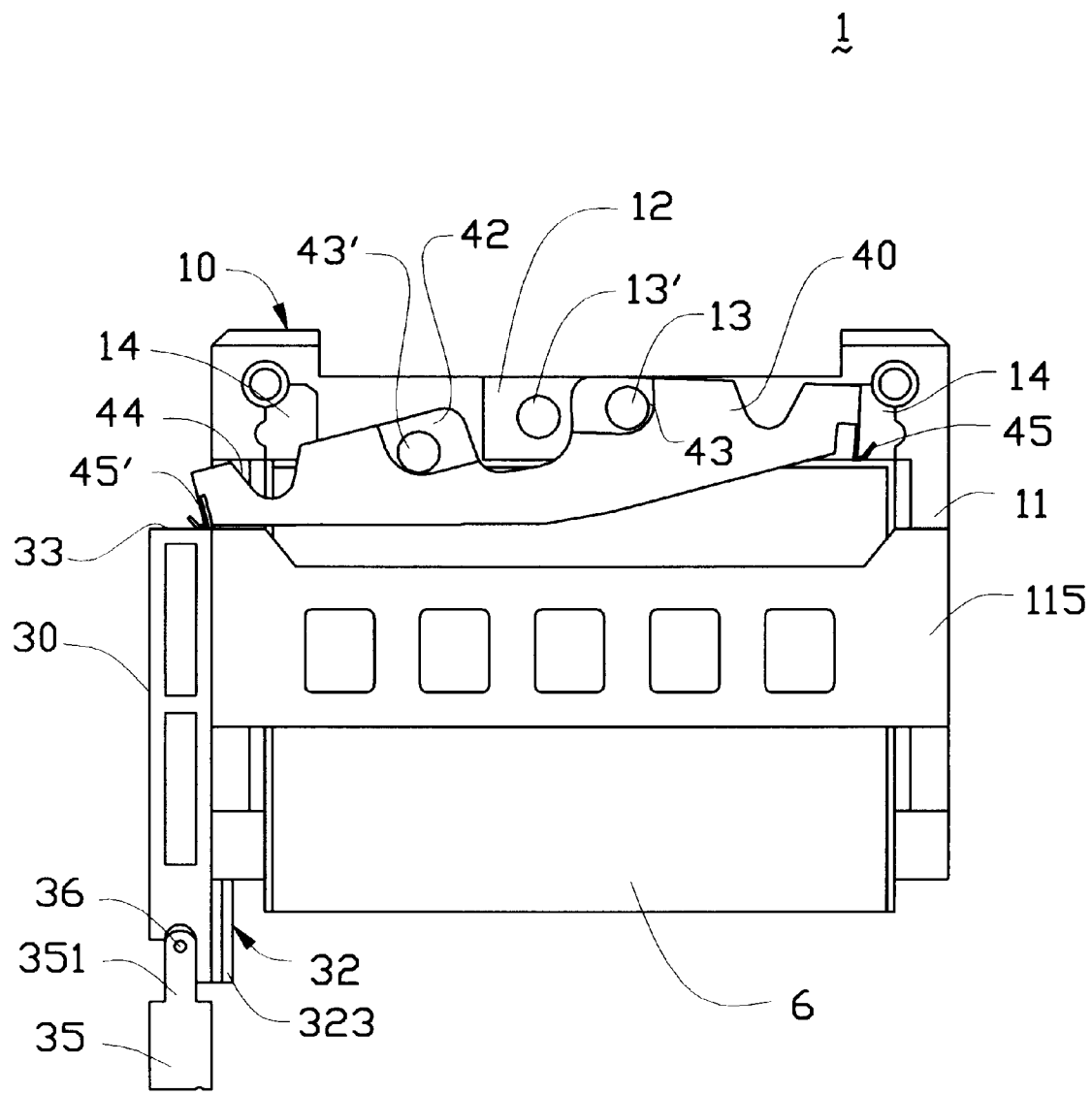
FIG. 2 is top view of the electronic card connector with an electronic card inserted therein.

Referring to the drawings and in particular to FIG. 1, an electronic card connector in accordance with the present invention, generally designated by reference numeral 1, has a substantially symmetric configuration comprising an insulative header 10 having two parallel guide arms 11 perpendicularly extending from opposite ends thereof defining a card receiving space 110 therebetween for receiving an electronic card 6 (FIG. 2). A connection plate 115 is formed between the guide arms 11.

The insulative header 10 retains a plurality of contact elements 20 therein. Each contact element 20 has a first end 21 extending into the card receiving space 110 for electrically engaging with the electronic card 6 and an opposite second end 22 extending beyond the header 10 for being mounted to a circuit board (not shown).

The insulative header 10 defines a central recess 12 in a top face (not labeled) thereof with two pivot pins 13, 13' formed therein. The header 10 further defines two slots 14 in the top face thereof which communicate with the card receiving space 110. A through hole 15 is further defined in the header 10 within each slot 14 for receiving a bolt (not shown) to secure the connector 1 to the circuit board.

Figure 3:
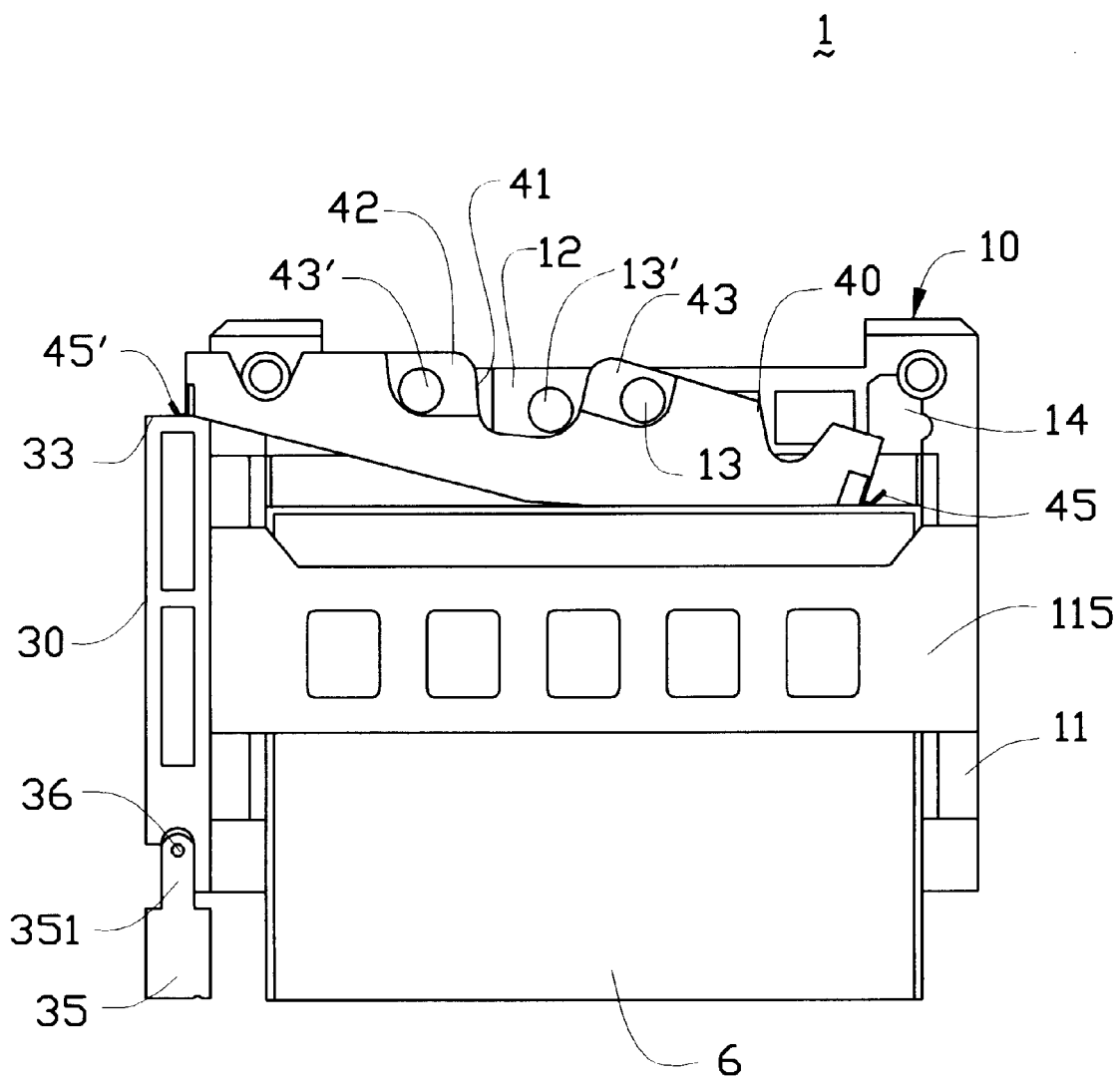
FIG. 3 is a top view of the electronic card connector with a card release bar mounted to a first guide arm thereof being actuated to release the card from the connector.
Figure 4:
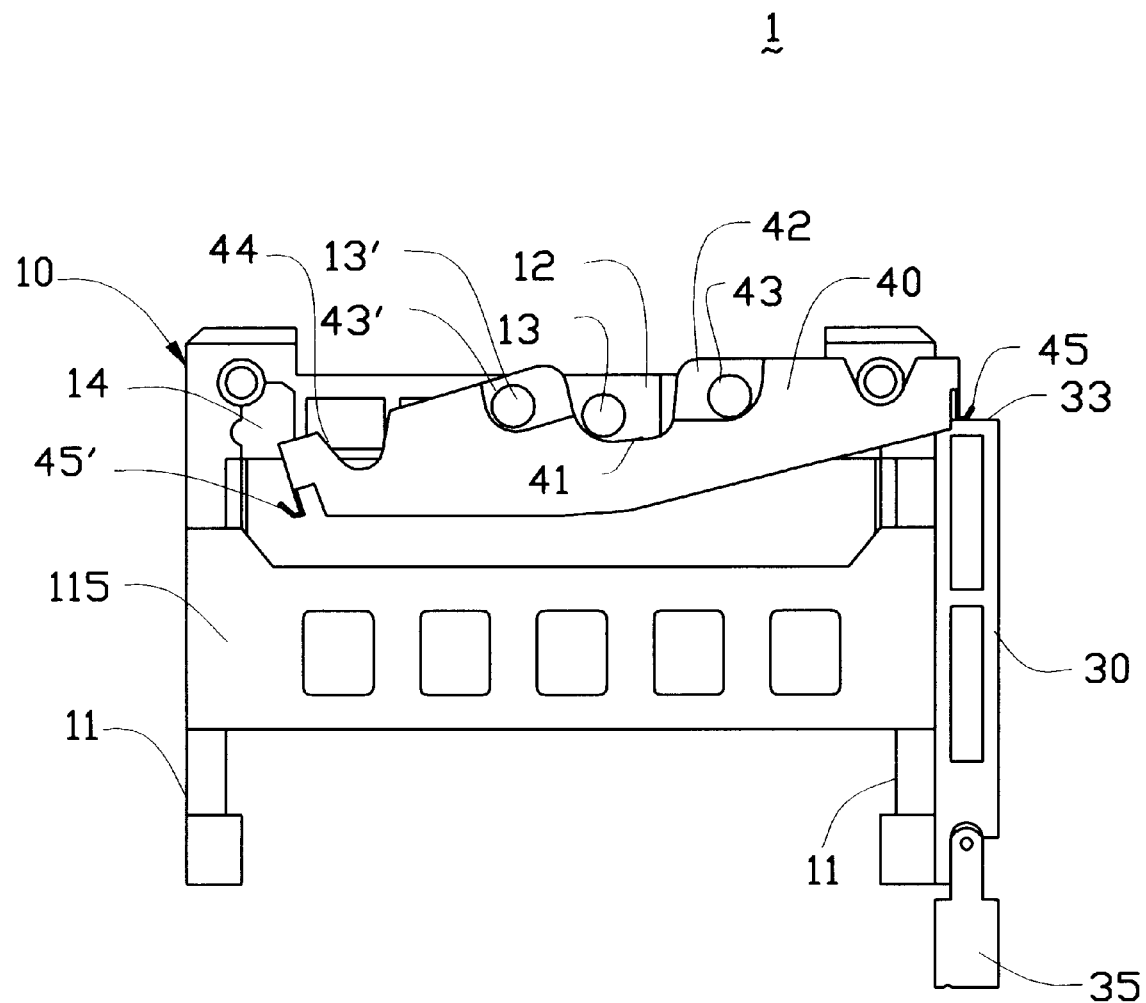
FIG. 4 is a top view of the electronic card connector with the card release bar mounted to a second guide arm thereof being actuated to release the card from the connector.
Figure 5:
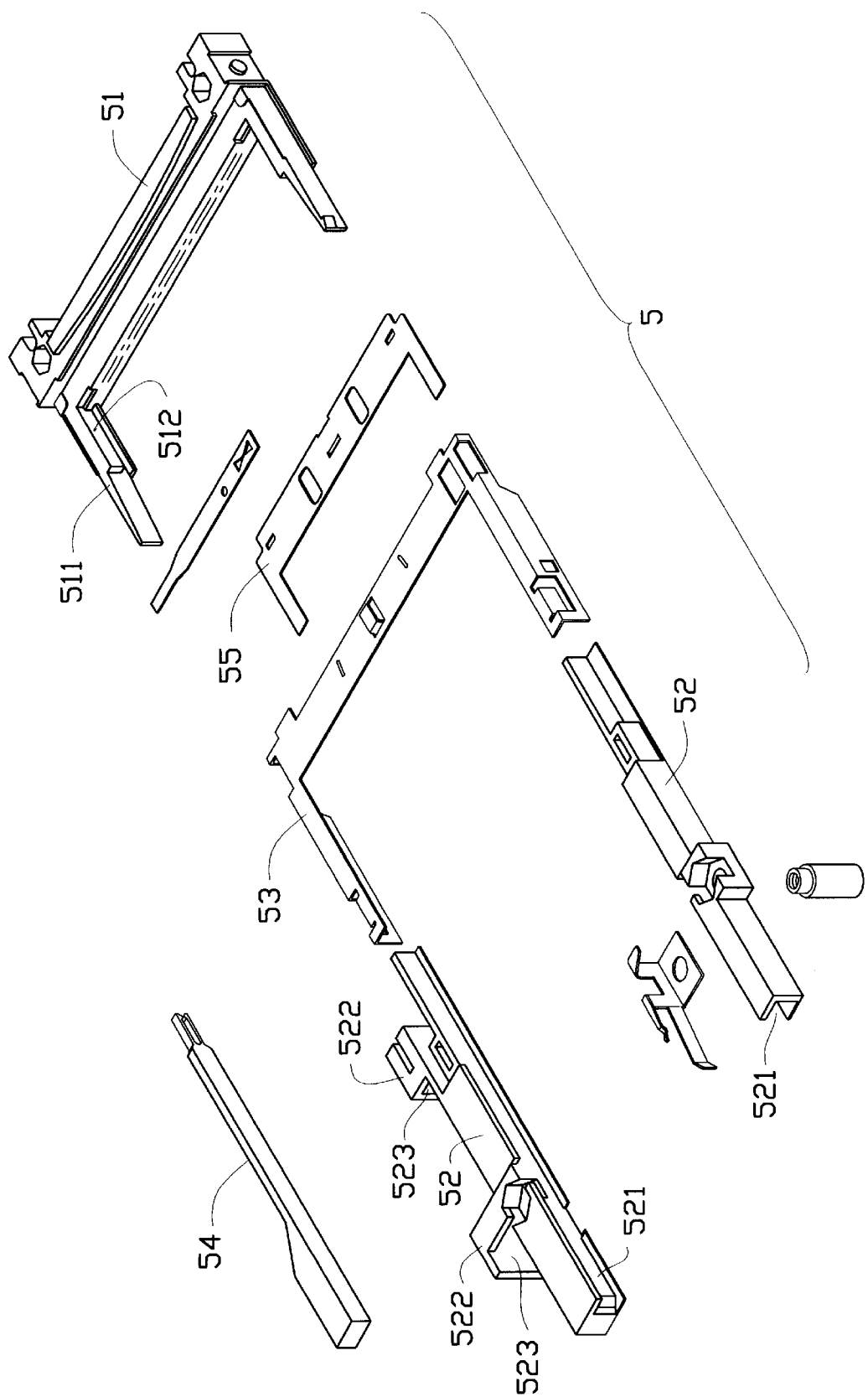
FIG. 5 is an exploded view of a conventional electronic card connector.

A rocking member 40 defines a central cutout 41 and has two recessed portions 42 formed on opposite sides of the central cutout 41. A hole 43, 43' is defined in each recessed portion 42. The holes 43, 43' are selectively fit over the pivot pins 13, 13' of the header 10 for forming pivotal engagement between either pivot pin 13, 13' and the corresponding hole 43, 43'. FIG. 3 shows the pivot pin 13 rotatably received in the hole 43 with the pivot pin 13' received in the central cutout 41 thereby not interfering with the rotation of the rocking arm 40 with respect to the header 10 about the pivot pin 13. Similarly, FIG. 4 shows the pivot pin 13' received in the hole 43' with the pivot pin 13 received in the central cutout 41 thereby not interfering with the rotation of the rocking arm 40 with respect to the header 10 about the pivot pin 13'. If desired, further cutouts 44 may be defined in the rocking member 40 corresponding to the through holes 15 for accommodating the bolts when the rocking member 40 rotates.

The rocking member 40 forms two enlarged engaging tabs 45, 45' on opposite ends thereof. The engaging tabs 45, 45' are selectively received in the corresponding slots 14 defined in the header 10 and coupled with a card release bar 30 (to be further described) in accordance with the pivotal engagement between the pivot pin 13, 13' and the hole 43, 43'. As shown in FIG. 3, when the pivotal engagement is formed between the pivot pin 13 and the hole 43, the engaging tab 45' is coupled with the card release bar 30 and the engaging tab 45 is movably received in the corresponding slot 14 and engages with the electronic card 6 whereby pushing the card release bar 30 inward to rotate the rocking member 40 causes the engaging tab 45 to move through the slot 14 and drive the electronic card 6 out of the connector 1. FIG. 4 shows the pivotal engagement formed between the pivot pin 13' and the hole 43'. The engaging tab 45 is coupled with the card release bar 30 and the engaging tab 45' is movably received in the corresponding slot 14 and engages with the electronic card 6 whereby pushing the card release bar 30 inward to rotate the rocking member 40 causes the engaging tab 45' to drive the electronic card 6 out of the connector 1.

Each guide arm 11 defines a guide channel 111 in an inside surface thereof and a slide channel 112 in an outside surface thereof. The guide channel 111 and the slide channel 112 are separated by a wall 113. The guide channels 111 receive and guide the electronic card 6 into the connector 1 as shown in FIG. 2. Each slide channel 112 is further defined by two inwardly projecting flanges 116. Each guide arm 11 further defines an elongate slot 114 within the slide channel 112.

The card release bar 30 selectively engages with the slide channel 113 of either guide arm 11. The card release bar 30 comprises two projections 31, 32 formed on an inner face thereof. Each projection 31, 32 forms two outwardly extending flanges 311, 323 movably received and engaging with the inwardly extending flanges 116 of the slide channel 113 of either guide arm 11 thereby allowing the card release bar 30 to move with respect to the guide arm 11.

The projection 32 has a resilient extension 321 on which a barb 322 is formed. The barb 322 is received in the elongate slot 114 and engages with opposite ends thereof thereby defining a stroke of the movement of the card release bar 30 with respect to the guide arm 30.

The card release bar 30 has an inner end 33 selectively engaging with one of the engaging tabs 45, 45' for coupling the rocking member 40 with the card release bar 30. An end section 35 is pivotally attached to an outer end of the card release bar 30 by means of a pin 36 extending through both the end section 35 and the card release bar 30. Preferably, the end section 35 comprises two spaced extensions 351 respectively received in two recesses 34 defined in top and bottom faces of the card release bar 30 thereby forming a knuckle joint. The knuckle joint allows the end section 35 to pivot with respect to the card release bar 30 between a coincident position where the end section 35 is substantially axially aligned with the card release bar 30 for facilitating a user's actuation of the card release bar 30 and a perpendicular position where the end section 35 is substantially perpendicular to the card release bar 30 for avoiding inadvertent exposure to an external force when not in use.

The resilient extension 321 of the card release bar 30 allows the barb 322 to be readily disengaged from the elongate slot 114 thereby detaching the card release bar 30 from the slide channel 112. The detachability of the card release bar 30 from the slide channel 112 allows the card release bar 30 to selectively engage with either one of the guide arms 11 of the connector 11 which, together with the symmetrical configuration, allows the electronic card connector 1 to be operable from both sides thereof.

In addition, the detachability of the card release bar 30 from the guide arms 11 allows a user to readily remove the card release bar 30 from the connector 1 when the card release bar 30 is not required thereby reducing the space occupied by the connector 1. Furthermore, since no projections are formed on the outside surface of the guide arms 11, the overall dimension of the electronic card connector 1 is reduced.

Although the present invention has been described with reference to the preferred embodiment, it is apparent to those skilled in the art that a variety of modifications and changes may be made without departing from the scope of the present invention which is intended to be defined by the appended claims.

What is claimed is:

1. An electronic card connector comprising:
   an insulative header having first and second guide arms defining a card receiving space therebetween adapted to receive an electronic card, the first guide arm defining a slide channel in an outside face thereof, the slide channel being further defined by two inwardly extending flanges;
   a plurality of contact elements retained in the insulative header with an end of each contact element extending into the card receiving space for electrically engaging with the electronic card;
   a rocking member defining a first hole rotatably fit over a first pivot pin formed on the header and having a first end movably received in a slot defined in the header and communicating with the card receiving space; and
   a card release bar comprising projections forming outwardly extending flanges, the projections being movably received in the slide channel of the first guide arm with the outwardly extending flanges thereof engaged with the inwardly extending flanges, one of the projections having a barb guidingly received in an elongate slot defined in the first guide arm within the slide channel whereby movement of the card release bar along the slide channel brings an inner end of the card release bar into driving engagement with a second end of the rocking member which rotates the rocking member about the first pivot pin thereby causing the first end of the rocking member to move through the slot to force the electronic card out of the connector;
   wherein the one projection of the card release bar comprises a resilient extension o which the barb is formed, the resilient extension allowing the barb to be readily disengaged from the elongate slot thereby detaching the card release bar from the first guide arm.

2. The electronic card connector as claimed in claim 1, wherein the card release bar comprises an end section pivotally attached to an outer end thereof.

3. The electronic card connector as claimed in claim 2, wherein the card release bar defines two recesses on opposite top and bottom faces thereof, a hole being defined through the card release bar between the top and bottom faces thereof, and wherein the end section comprises two opposite extensions respectively received in the recesses and each defined an aligned hole, a pivotal pin extending through the holes defined in the extensions of the end section and the hole of the card release bar for forming a knuckle joint therebetween.

4. The electronic card connector as claimed in claim 1, wherein a slide channel is defined in the second guide arm and an elongate slot is formed within the slide channel and is adapted to be releasably engageable with the card release bar, whereby the card release bar is selectively mounted to either one of the guide arms, and wherein the header forms a second pivot pin and the rocking member defines a second hole, the second hole being rotatably fit over the second pivot pin for selectively forming a pivotal joint therebetween whereby the second end of the rocking member is movably received in a second slot defined in the header and the first end of the rocking member is drivingly engaged with the inner end of the card release bar when the card release bar is mounted to the second guide arm to cause the second end of the rocking arm to force the electronic card out of the connector.

5. The electronic card connector as claimed in claim 4, wherein the header and the rocking member have a symmetric configuration.

6. The electronic card connector as claimed in claim 5, wherein the rocking member defines a central cutout between the first and second holes for selectively accommodating either one of the first and second pivot pins of the header when the pivot pins is not received in the corresponding hole for eliminating mechanical interference between the header and the rocking member.

7. The electronic card connector as claimed in claim 4, wherein each end of the rocking member forms an enlarged engaging tab dimensioned to be received in the corresponding slot of the header.

8. The electronic card connector as claimed in claim 1, wherein the guide arms define opposing guiding channels in inside faces thereof for guiding the electronic card into the card receiving space.

9. An electronic card connector comprising:

an insulative header having first and second guide arms defining a card receiving space therebetween adapted to receive an electronic card, said header defining two pivot pins;

a plurality of contact elements retained in the insulative header with an end of each contact element extending into the card receiving space for electrically engaging with the electronic card;

a rocking member defining a first hole and a second hole adapted to mutually exclusively receive the corresponding first pivot pin and the second pivot pin, respectively, corresponding to a card release bar attached to an exterior area of one of said first and second guide arms wherein one end of the rocking member, which is farther from the card release bar, is pivotally moveably within the card receiving space while the other end, which is closer to the card release space, extends outside said one of the first and second guide arms and engages with a distal end of the card release bar.

* * * * *